Patented Aug. 18, 1936

2,051,767

UNITED STATES PATENT OFFICE 2,051,767

METHOD OF MAKING OIL-SOLUBLE RESINS

Mortimer T. Harvey, East Orange, N. J., assignor to The Harvel Corporation, a corporation of New Jersey No Drawing. Application October 22, 1935, Serial No. 46,166

2 Claims. (Cl. 260—3)

The present invention relates to the making of oil soluble, fusible resinous condensates, with ammonia as an activating agent, from reactive methylene group containing agents and tertiary hydrocarbon ethers of substituted phenols which latter have at least one readily reactive position on the phenol nucleus unoccupied.

The present application is a continuation in part of my copending application Ser. No. 716,333, filed March 19, 1934.

According to German Patent 406,152 strong organic acids are required to bring about the condensation of formaldehyde with phenolic ethers such as the methyl ether of phenol and the ethyl ether of cresol. And according to Hill, U. S. Patent 2,003,291 acid mediums are necessary to condense formaldehyde with ethers of 1.3.5 xylenol. It is known that formaldehyde will not condense with the methyl ether of phenol or of cresol in the presence of ammonia.

I have discovered that tertiary ethers of the cresols and of the xylenols will condense with formaldehyde in contact with ammonia and condensation products can be made by reacting hexamethylene tetramine with the tertiary ethers of the cresols and the xylenols, and that the resinous products obtainable by these reactions are oil soluble, fusible and light colored.

By "readily reactive position on the phenol nucleus" is meant the ortho and the para positions.

By the term "oil soluble" is meant soluble in drying and semi-drying oils such as linseed oil, China-wood oil, perilla oil and soya bean oil.

By the "fusible resin" is meant a resin which is still soft after continued heating at about 105° C. for twenty-four hours is still soft at that temperature.

By "reactive methylene group containing agents" is meant such materials as formaldehyde, paraformaldehyde, ethyl aldehyde, paraldehyde, furfuraldehyde, benzaldehyde, butyl aldehyde, hexamethylene tetramine and their equivalents.

An object of the present invention is to provide an economical method of making light colored, oil soluble and fusible resinous condensations of a methylene group with the tertiary ethers of substituted phenols, the method comprising bringing about the reaction in contact with ammonia. In some cases hexamethylene tetramine is used to supply both the ammonia (or substituted ammonia) group and the methylene group.

Another object of the present invention is to provide a method of utilizing mixtures of plural substituted phenols and the corresponding tertiary ethers of substituted phenols in the making of resinous condensations without the cost of changing the ethers into the plural subsituted phenols.

Other objects and advantages of the present invention will appear from the present disclosure and the appended claims forming part hereof.

Illustrative examples of the methods and products of the present invention are as follows:

Example I.—Substantially molecular parts of tertiary butyl ether of 1.4.2 xylenol and formaldehyde, in aqueous solution, are refluxed together with a 26% aqueous ammonia solution, the latter in amount about six per cent of the weight of the ether, for about eight hours after which the water is removed and the condensation product heated to the desired body.

Example II.—About one hundred parts by weight of a mixture of tertiary butyl ethers of ortho, meta and para cresols and 1.4.2 xylenol (containing about 50% of the xylenol ether, 10% ethers of the cresols and the rest the corresponding trisubstituted phenols which result from the conversion of these ethers), about sixty parts of 40% formaldehyde solution and six parts of 26% aqueous ammonia are refluxed together for about eight hours, after which the water is removed by gravimetric separation followed by heating. The resinous condensate is then heated to the desired body.

Example III.—About one hundred parts by weight of a mixture of tertiary butyl ethers of phenol, o-cresol and meta para cresol and twenty-five parts hexamethylene tetramine are heated together at about 170° C. until a cooled sample will become hard and brittle. This can be done in about one hour and a half and the resin is oil soluble and fusible.

Example IV.—A given weight of a mixture comprising about eighty per cent tertiary butyl ether of ortho cresol and twenty per cent para tertiary butyl ortho methyl phenol are refluxed for about six to eight hours with a molecular proportion of a forty per cent aqueous solution of formaldehyde (a molecular proportion for each of the ether and the phenol) and 26% aqueous ammonia solution in amount about six per cent of the weight of the mixture of phenols and ethers used. The water is then removed and the condensation reaction product is heated to the desired consistency.

In each of the above examples a desired consistency can be to a hard, brittle button when cold and the temperature of heating to acquire it can be about 150° to 170° C., for example. Both before and after the hard, brittle button state is reached the condensate is oil soluble, and in the hard, brittle button state the condensate is fusible.

While I have recited only tertiary butyl ethers in the examples other tertiary hydrocarbon ethers can be used, for example, in each of the above examples a corresponding amount of the corresponding tertiary amyl phenol ethers can be used.

In carrying out the methods of the present invention it is to be understood that the ethers disclosed can be used together with phenols, for example those phenols which result from the transformation of the hydrocarbon group from the ether position to a substituted position on the phenol nucleus. For example, when the tertiary butyl ether of 1.4.2 xylenol is used a corresponding trisubstituted phenol may be present, and this trisubstituted phenol may be 2-methyl 3-tertiary butyl 4-methyl phenol. Likewise when tertiary butyl ether of ortho cresol is used ortho methyl para tertiary butyl phenol may be present. Also phenol ($C_6H_5OH$) can be present. In these cases the phenols will condense with the methylene group to form part of the resinous condensation and the resulting resinous condensates are oil soluble and fusible.

Having thus described my invention, what I claim and desire to protect by Letters Patent is:

1. The method of making oil soluble fusible resinous condensations which comprises heating, in contact with ammonia, an aldehyde with a tertiary hydrocarbon ether of a phenol having one or more hydrocarbon substituents but having at least one of the readily reactive positions unsubstituted.

2. The method of making oil soluble fusible resinous condensations which comprises heating formaldehyde with a tertiary hydrocarbon ether of a phenol having one or more hydrocarbon substituents but having at least one of the readily reactive positions unsubstituted, with ammonia as a catalyst.

MORTIMER T. HARVEY.